United States Patent
Prakah-Asante et al.

(10) Patent No.: US 7,321,817 B2
(45) Date of Patent: Jan. 22, 2008

(54) AUTOMOBILE FRONTAL COLLISION LOCATION DETECTION FOR COORDINATED ACTIVATION OF SAFETY SYSTEMS

(75) Inventors: Kwaku O. Prakah-Asante, Commerce Township, MI (US); Manoharprasad K. Rao, Novi, MI (US); Gary S. Strumolo, Beverly Hills, MI (US); Jeanette J. Epps, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 499 days.

(21) Appl. No.: 10/729,104

(22) Filed: Dec. 5, 2003

(65) Prior Publication Data

US 2004/0117091 A1 Jun. 17, 2004

Related U.S. Application Data

(60) Provisional application No. 60/432,973, filed on Dec. 13, 2002.

(51) Int. Cl.
*B60R 21/32* (2006.01)

(52) U.S. Cl. ........................ 701/45; 280/735; 180/271

(58) Field of Classification Search ............ 701/45–47; 280/728.1, 728.2, 730.2, 733–735; 180/271, 180/274, 282
See application file for complete search history.

(56) References Cited

U.S. PATENT DOCUMENTS

| | | | |
|---|---|---|---|
| 4,868,447 A | 9/1989 | Lee et al. | |
| 4,924,131 A | 5/1990 | Nakayama et al. | |
| 5,014,810 A | 5/1991 | Mattes et al. | |
| 5,195,046 A | 3/1993 | Gerardi et al. | |
| 5,256,904 A | 10/1993 | Tohbaru | |
| 5,336,959 A | 8/1994 | Park et al. | |
| 5,445,412 A | 8/1995 | Gillis et al. | |
| 5,658,011 A * | 8/1997 | Byon | 280/735 |
| 5,767,766 A | 6/1998 | Kwun | |
| 5,777,225 A | 7/1998 | Sada et al. | |
| 5,797,623 A | 8/1998 | Hubbard | |
| 5,899,949 A * | 5/1999 | Kincaid | 701/45 |
| 5,936,549 A * | 8/1999 | Tsuchiya | 340/903 |
| 6,139,052 A * | 10/2000 | Preamprasitchai | 280/735 |
| 6,204,756 B1 | 3/2001 | Senyk et al. | |
| 6,327,528 B1 * | 12/2001 | Vallette et al. | 701/45 |
| 6,329,910 B1 | 12/2001 | Farrington | |
| 6,540,255 B1 * | 4/2003 | Blank et al. | 280/735 |
| 6,607,212 B1 * | 8/2003 | Reimer et al. | 280/735 |
| 6,748,307 B1 * | 6/2004 | Sala et al. | 701/46 |
| 6,804,595 B1 * | 10/2004 | Quail et al. | 701/45 |
| 6,816,766 B2 * | 11/2004 | Sala et al. | 701/45 |
| 7,046,167 B2 * | 5/2006 | Rao et al. | 340/903 |
| 7,048,086 B2 * | 5/2006 | Yoneda | 180/274 |
| 2002/0008372 A1 | 1/2002 | Bacher et al. | |
| 2002/0013649 A1 | 1/2002 | Anishetty et al. | |

* cited by examiner

*Primary Examiner*—Gary Chin
(74) *Attorney, Agent, or Firm*—Frank MacKenzie; Dickinson Wright PLLC

(57) ABSTRACT

A safety system (10) for a vehicle (12) includes multiple collision detection sensors (14), such as discretized patch sensors. The collision detection sensors (14) are coupled to a peripheral area (18) of the vehicle (12) and generate a collision detection signal (17). A controller (16) is coupled to the sensors (14) and determines collision type in response to the collision detection signal (17). The controller (16) performs a countermeasure in response to the collision type. The controller (16) may include a collision location estimator (22) for determining collision severity and collision contact location on the vehicle (12) and a coordinated device activation system (24) for performing the countermeasure.

15 Claims, 3 Drawing Sheets

AUTOMOBILE FRONTAL COLLISION LOCATION DETECTION FOR COORDINATED ACTIVATION OF SAFETY SYSTEMS

CROSS-REFERENCE TO RELATED APPLICATIONS

The present invention claims priority from U.S. Provisional Application Ser. No. 60/432,973, entitled "Automobile Impact Location Detection For Coordinated Activation of Safety System", filed Dec. 13, 2002.

TECHNICAL FIELD

The present invention relates generally to automobile collision location detection systems, and collision countermeasure systems. More particularly, the present invention relates to a system and method of accurately assessing a collision location and collision type, and appropriately performing countermeasures in response to that assessment.

BACKGROUND OF THE INVENTION

Automobiles utilize safety restraint systems to protect vehicle occupants. The restraint systems may include restraints, such as front airbags, side airbags, and seat-belt pretensioners. The restraint systems typically include passive accelerometer-based collision severity sensors, which are used to gather information for control and deployment of the restraints. A controller within the restraint systems performs calculations to differentiate between a collision event for which deployment or non-deployment of a restraint is desired. In general, this differentiation is most difficult to perform during vehicle-to-vehicle offset type collisions and oblique type collisions, mainly due to the difficulty in the detection of these collisions.

Depending upon the particular collision sensor scheme, post-collision sensors may utilize from approximately 5-20 ms of post-collision time to obtain, process, and transmit collision data during an approximate 48 kmh equivalent fixed barrier collision. For non-barrier collisions of equivalent severity, longer data times may be utilized.

Sensing and deployment control systems that are used in the activation of safety systems tend to utilize single-point or dual-point collision sensors to detect a collision. The collision sensors are typically in the form of solid-state accelerometers that are located in a vehicle compartment, such as in a dashboard, in a tunnel location, behind a bumper, or on a radiator support. The accelerometers are used to detect collision conditions early on in a collision event and provide information related to the collision severity. Various algorithms are then utilized to evaluate the collision conditions and the collision severity for the deployment of safety systems.

The algorithms utilize accelerometer information, collected early in a collision event and in response to a collision, to determine timing for deployment of restraint systems. It is desirable in the deployment of the restraint systems to prevent inappropriate deployment timing or inadvertent deployment of the restraint systems. Thus, deployment thresholds are often set in response to the type of collision and the associated conditions thereof.

Special collision events such as low speed barrier collisions, pole collisions, and various vehicle-to-vehicle collisions provide the greatest challenges for collision sensor design, and collision type determination. The term "collision type" generally refers to the location on a host vehicle that is involved in the collision and may include other related information. A collision type may for example refer to whether a particular collision is a full-frontal, an oblique, or an offset collision, as well as include information related to relative location, and collision change in velocity of an object of concern. Oblique type collisions are generally more difficult to detect compared to a full or head-on collision.

Sensor and algorithm design criteria of a countermeasure system ensure that the performance of a sensing system satisfy timing requirements for various different collision types and also have the capability of appropriately maintaining safety systems in a deactivated state during non-deployment conditions. Thus, there exists a need for an improved post-collision sensing system and method for detecting a collision type and appropriately activating safety systems. It is further desirable to provide a system that is inexpensive to manufacture, such that it may be readily used in various vehicle platforms.

SUMMARY OF THE INVENTION

The present invention provides a safety system for a vehicle that includes multiple collision detection sensors, such as discretized patch sensors. The collision detection sensors are coupled to a peripheral area of the vehicle and generate a collision detection signal. A controller is coupled to the sensors and determines collision type in response to the collision detection signal. The controller performs a countermeasure in response to the collision type. The controller may include a collision location estimator for determining collision severity and collision contact location on the vehicle and a coordinated activation device for performance of the countermeasure.

The embodiments of the present invention provide several advantages. One such advantage is the provision of a safety system that includes the use of multiple discretized patch sensors. The use of the stated sensors and associated algorithms, allows the safety system to accurately determine collision contact location information and severity of a collision. This accurate determination allows for reliable and improved performance of a countermeasure, such as deployment of a safety system restraint. Depending on the magnitude of the collision and the determined collision type, respective restraints are deployed. Also, the use of the discretized patch sensors and decision-making algorithms minimizes the restraint system deployment time for determining collision type.

Another advantage provided by an embodiment of the present invention is the provision of a safety system that includes an evaluation algorithm that allows for accurate determination of collision severity and collision contact location. In another embodiment of the present invention information related to the location of a collision is utilized in the deployment of adaptive structures, including structural stiffeners for improved occupant protection and vehicle compatibility.

Furthermore, the combination of the above stated advantages aids in the prevention of inappropriate deployment timing or inadvertent deployment of restraint systems.

Another advantage provided by an embodiment of the present invention is the collision-zone mounting of the discretized patch sensors, which minimizes the effect of vehicle stiffness characteristics on generated collision detection signals.

Yet another advantage provided by an embodiment of the present invention is the use of occupant characteristic data in conjunction with a determined collision-type and a collision severity for coordinated activation of safety systems to provide augmented functionality.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail, in the accompanying figures and described below by way of examples of the invention wherein.

DETAILED DESCRIPTION

Figure 1:
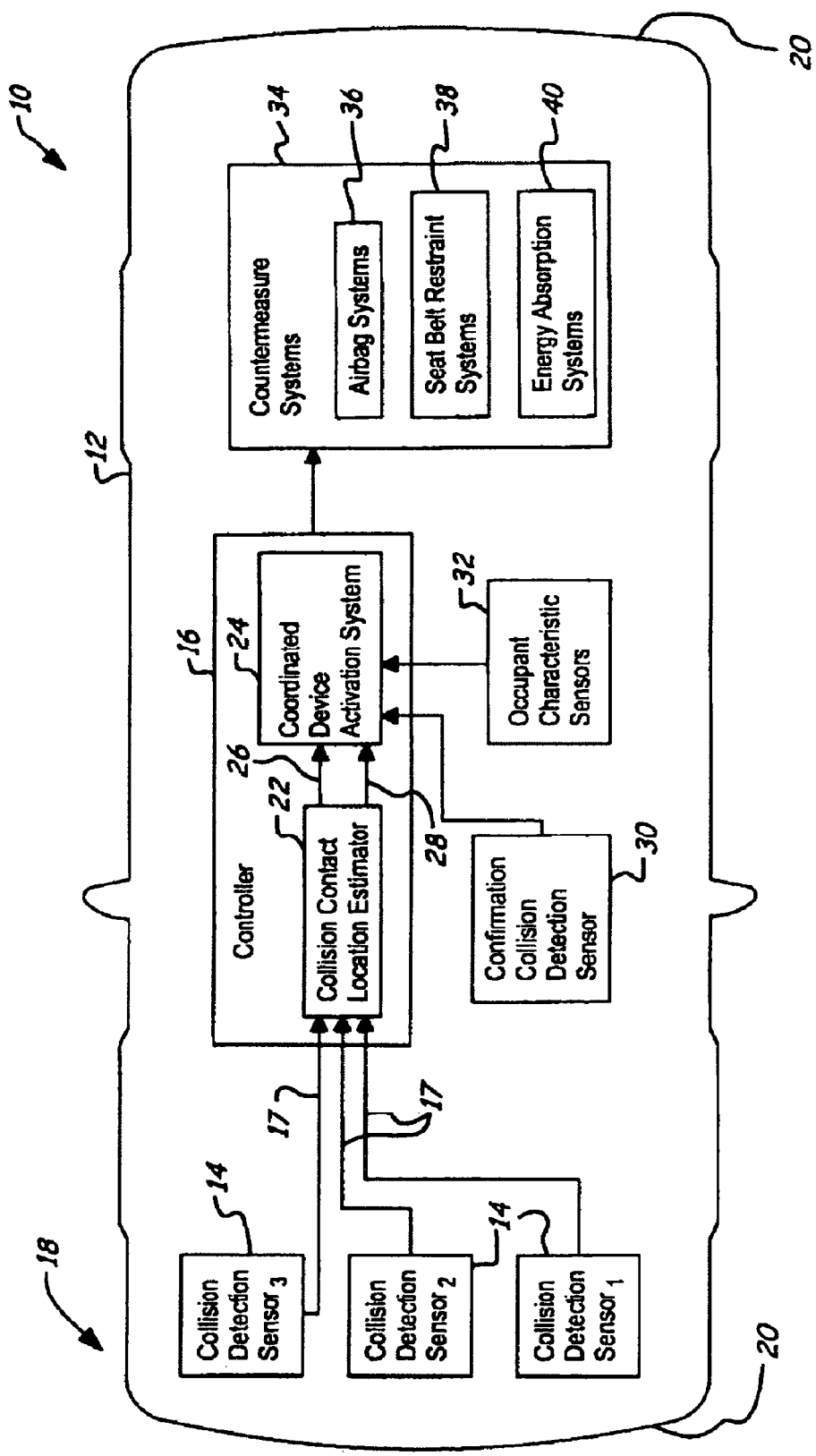
FIG. 1 is a block diagrammatic view of an integrated collision location determination safety system for a vehicle in accordance with an embodiment of the present invention.

In the following figures, the same reference numerals will be used to refer to the same components. While the present invention is described with respect to a system and method of determining a collision type for a vehicle and coordinating activation of safety systems, the present invention may be adapted to be used in various applications and systems including: countermeasure systems, vehicle systems, or other systems known in the art. The present invention may be used to supplement a pre-collision sensing system.

In the following description, various operating parameters and components are described for one constructed embodiment. These specific parameters and components are included as examples and are not meant to be limiting.

Also, in the following description the term "performing" may include activating, deploying, initiating, powering, and other actions known in the art that may describe the manner in which a countermeasure may be operated.

Additionally, in the following description the term "countermeasure" may refer to an object or may refer to an action. For example, a countermeasure may be performed or a countermeasure may be activated. An airbag is a countermeasure. A controller may perform a countermeasure by signaling the airbag to deploy.

Moreover, a countermeasure device may be any device within an automotive vehicle that is used in conjunction with a collision countermeasure system including: a controller, a vehicle system, an indicator, or other countermeasure device known in the art.

In addition, the term "collision type" refers to collision severity and collision contact location of a collision. Collision type may include whether a collision is a frontal-oblique, offset, or head-on collision, as well as refer to other collision location type descriptions known in the art. A collision type may also include information related to relative size, weight, and collision change-in-velocity, as well as other collision type related information known in the art.

Referring now to FIG. 1, a block diagrammatic view of a safety system 10 for a vehicle 12 is shown in accordance with an embodiment of the present invention. The safety system 10 includes multiple collision detection sensors 14, a controller 16, and various other sensors and countermeasure devices.

The collision detection sensors 14 are used in the detection of a collision, in the determination of the severity and collision contact location of a collision, and in the determination of collision type. The collision sensors 14 generate collision detection signals 17 in response to the force exerted across the surface area of each sensor 14. The collision sensors 14 may be in the form of discretized patch sensors or the like. Patch sensors provide a surface area of contact for collision detection as opposed to accelerometers that provide single point detection. The collision sensors 14 may be formed from a poly-vinylidine fluoride (PVDF) material or other material having similar properties. PVDF sensors are based on the piezoelectric phenomenon, which is the ability of materials to develop an electric charge proportional to a mechanical stress. As a polymer, PVDF material is durable and thin and when effectively bonded and embedded does not alter the static and dynamic stiffness and mass characteristics of a vehicle structure, such as the bumpers 20.

The collision sensors 14 are mounted within a peripheral area 18 of the vehicle 12. Peripheral mounting of the collision sensors 14 increases sensitivity and thus signal output of the sensors 14. In one embodiment of the present invention, the collision sensors 14 are bonded within or on the bumpers 20 of the vehicle 12. The collision sensors 14 do not require power to operate and may be in the form of a composite. Although three collision sensors are shown as being mounted to a bumper of the vehicle 12 and are designated as collision detection sensors 1-3, any number of collision sensors may be used.

During a collision, surface areas of the sensors 14 and corresponding areas on the bumpers 20 that are in direct contact with an object being collided therewith, hereinafter referred to as a collision object, develop a higher mechanical stress. The higher mechanical stress results in a higher signal output. The system 10 detects the type of collision based on the response from the sensors 14; the response signal magnitude, phase, and signature are monitored.

The controller 16 includes a collision contact location estimator 22 and a coordinated device activation system 24. The collision estimator 22 determines the collision severity and the collision contact location. The collision estimator 22 is also used in the detection of a collision and samples synchronized voltages from the collision sensors 14 for collision-type determination. The coordinated system 24 performs countermeasures in response to the collision severity and the collision contact location. A collision severity signal 26 and a collision location signal 28 are generated by the estimator 22 and received by the coordinated system 24.

The coordinated system 24 may be coupled to various sensors and countermeasure devices. For example, the coordinated system 24 may be coupled to a confirmation collision detection sensor 30, as shown. The confirmation sensor 30 may be in the form of one or more accelerometers. The confirmation sensor 30 may be used to verify that a collision has occurred and that a collision event has been initiated. The confirmation sensor 30 may be located in various locations on the vehicle 12, such as in a vehicle occupant compartment (not shown). The confirmation sensor 30 may, for example, be located within and be used to determine deceleration of the occupant compartment.

The coordinated system 24 may also be coupled to occupant characteristic sensors 32. The occupant sensors 32 may be used to determine occupant classification, weight, size, and location within a seat system. The occupant sensors 32 may include seat belt status sensors (not shown) for determining a current position or tension of seat belts within the vehicle 12. Any number of occupant sensors 32 may be used and, all of which may be located in various locations on the vehicle 12.

The coordinated system 24 is coupled to multiple countermeasure systems 34. The countermeasure systems 34 may include adaptive and passive countermeasures. Some example passive countermeasures are shown and include the air bag systems 36, the seat belt restraint systems 38, such a belt pretensioners and load limiting seat belts, and the energy absorption systems 40, such as a structural stiffener. The energy absorption systems 40 may include an adaptive stiffening system, which adaptively adjusts structural stiffness within a given area of the vehicle in response to the information obtained from the collision contact location estimator.

Figure 2:
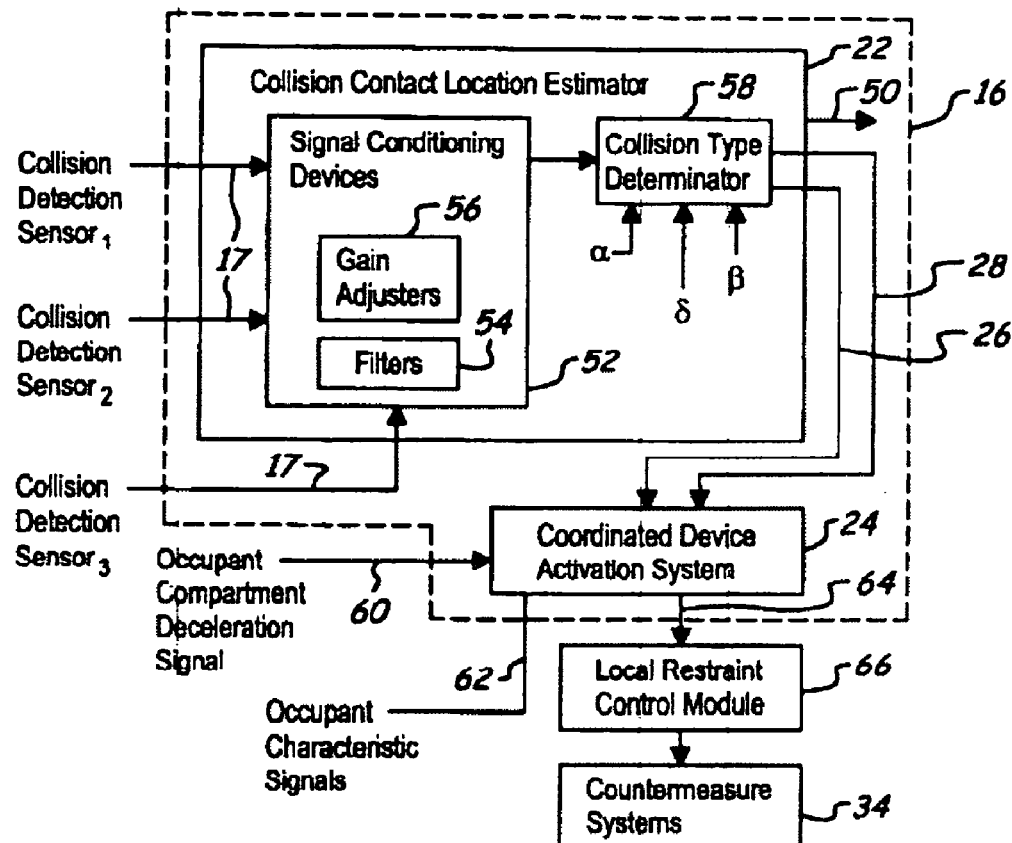
FIG. 2 is a functional block diagrammatic view of a sample architecture of a controller of the safety system of FIG. 1 in accordance with an embodiment of the present invention.

Referring now also to FIG. 2, where a functional block diagrammatic view of the architecture of the controller 16 in accordance with an embodiment of the present invention is shown. As stated above, the controller 16 includes the collision estimator 22 and the coordinated system 24. The collision estimator 22 receives the collision signals 17 from the collision sensors 14 and generates the severity signal 26 and the location signal 28, which are received by the coordinated system 24.

The collision estimator 22 may have a collision confirmation signal output 50. The confirmation signal output 50 may be utilized by other system controls or safety systems in performance of various countermeasures and other vehicle tasks. The collision estimator 22 includes signal-conditioning devices 52, such as filters 54 and adaptive gain-adjusters 56, which may filter and amplify the collision signals 17 before reception by the collision type determinator 58. The collision type determinator 58 generates the severity signal 26 and the collision type signal 28 in response to the collision signals 17, as well as in response to a pair of location thresholds values α and β and a collision confirmation threshold value δ. The threshold values α, β, and δ may be in the form of predetermined values. These values are described in further detail below.

The coordinated system 24 generates a countermeasure signal 64 in response to the severity signal 26 and the collision type signal 28. The coordinated system 24 may also receive an occupant compartment deceleration signal 60 from the confirmation sensor 30, occupant characteristic signals 62 from the occupant sensors 32, and may consider these signals in the generation of the countermeasure signal 64. The countermeasure signal 64 may be received directly by one or more of the countermeasure systems 34 or may be received indirectly through use of a local restraint control module 66, as shown.

The controller 16 and the local restraint control module 66 may be microprocessor based such as a computer having a central processing unit, have memory (RAM and/or ROM), and have associated input and output buses. The controller 16 and the local restraint control module 66 may be in the form of an application-specific integrated circuit or may be formed of other logic devices known in the art. The controller 16 and the local restraint control module 66 may be a portion of a central vehicle main control unit, an interactive vehicle dynamics module, or a main safety controller. The controller 16 and the local restraint control module 66 may be combined into a single controller or may be stand-alone controllers as shown.

Figure 3:
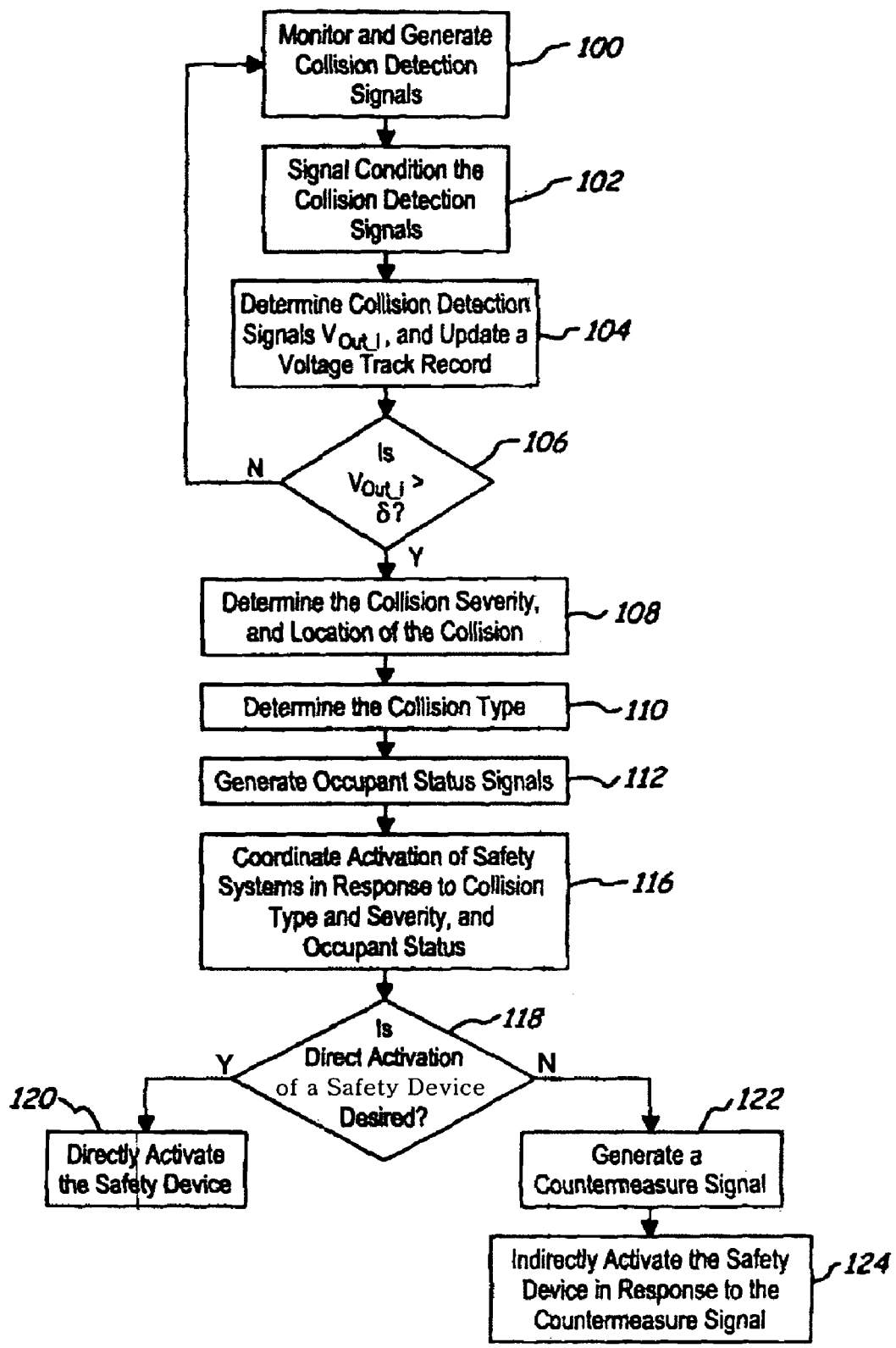
FIG. 3 is a logic flow diagram illustrating a method of determining collision type of a vehicle and of coordinating activation of safety systems in accordance with an embodiment of the present invention.

Referring now to FIG. 3, a logic flow diagram illustrating a method of determining collision type of the vehicle 12 and coordinating activation of safety systems is shown in accordance with an embodiment of the present invention.

In step 100, the controller 16 monitors the collision signals 17 received from the collision sensors 14. The collision sensors 14, in the event of a collision, detect the collision and generate the collision signals 17. In step 102, the collision signals 17 are signal conditioned and the resulting signals are tracked. The collision signals 17 may be filtered and amplified via the filters 54 and the gain adjusters 56.

In step 104, the collision estimator 22 generates a resultant collision detection signal $V_{out\_i}$ for each sensor 14, which is determined using equation 1, where $K_i$ is the adaptive gain for gain adjusters 56, $V_i$ is voltage output from the $i^{th}$ collision sensor, and $\tau$ is the time-constant of the filters 54.

$$V_{out\_i} = K_i V_i (1 - e^{-\tau t}) \tag{1}$$

The sum of the output voltages $V_{out\_s}$ for an n number of collision detection sensors is represented by equation 2 and is used to compare average voltage signal values with expected values to assure proper sensor functionality.

$$V_{out\_s} = \sum_{i=1}^{n} V_{out\_i} \tag{2}$$

In step 106, the collision detection signal $V_{out\_i}$ is compared with the confirmation threshold value δ to determine whether a collision has occurred. When the resultant collision detection signal $V_{out\_i}$ is greater than the confirmation threshold value τ, the collision estimator 22 determines that a collision has occurred and step 108 is performed, otherwise the collision estimator 22 returns to step 100.

In step 108, the severity of the collision relative to each collision sensor 14 is determined, utilizing the expression provided by equation 3. $CCLE_i$ represents the collision contact location estimation value for the $i^{th}$ collision sensor, α is a high-end location thresholds value, β is a low-end location threshold value, and k corresponds with a collision sensor other than the $i^{th}$ collision sensor. In general the high-end value α is greater than the low-end value β.

$$CCLE_i = \begin{cases} 1 & \text{if } (V_{out\_i} > \delta) \text{ and } (V_{out\_i} - V_{out\_k}) > \alpha, \text{ for all } k \\ -1 & \text{if } (V_{out\_i} > \delta) \text{ and } (V_{out\_i} - V_{out\_k}) < \beta, \text{ for all } k \\ 0 & \text{if } V_{out\_1} \leq \delta \\ 0 & \text{otherwise} \end{cases} \tag{3}$$

A $CCLE_i$ value of one may indicate a localized collision at the location of sensor i. A $CCLE_i$ value of negative one may indicate a full collision across all sensor locations. A $CCLE_i$ value of zero may indicate that a collision has not occurred or that a collision has occurred but not at the location of sensor i.

For example, for a frontal collision detection system, such as system 10, with three frontal collision detection sensors 14 and the first collision detection sensor, being located on the driver side of the vehicle 12, the $CCLE_i$ value can be determined using the expression of equation 4. $V_{Out\_2}$ and $V_{Out\_3}$ are collision detection signals from the second collision sensor$_2$ and the third collision sensor$_3$, which are located in the center and on the passenger side of the vehicle 12, respectively.

$$CCLE_1 = \begin{cases} 1 & \text{if } (V_{out\_1} > \delta) \text{ and } (V_{out\_1} - V_{out\_2}) \\ & \text{and } (V_{out\_1} - V_{out\_3}) < \alpha \\ -1 & \text{if } (V_{out\_1} > \delta) \text{ and } (V_{out\_1} - V_{out\_2}) \\ & \text{and } (V_{out\_1} - V_{out\_3}) < \beta \\ 0 & \text{if } V_{out\_1} \le \delta \\ 0 & \text{otherwise} \end{cases} \quad (4)$$

For the example embodiment provided: a $CCLE_1$ value of one may indicate a left-side collision or a driver side collision; a $CCLE_1$ value of negative one may indicate a full-collision or direct head-on collision; and a $CCLE_1$ value of zero may indicate that a collision has not occurred or that a collision has occurred, but not on the left side of the vehicle. A similar expression and values may be derived for each of the collision sensors 14.

In step 110, the collision type is determined. In the embodiment as illustrated, the collision type includes determining whether the collision is a left side collision, a full frontal collision, or a right or passenger side collision. The left side collision and the right side collision may be considered as oblique collisions. Other types of collisions including pole collisions and other collision type information may be determined.

Figure 4:
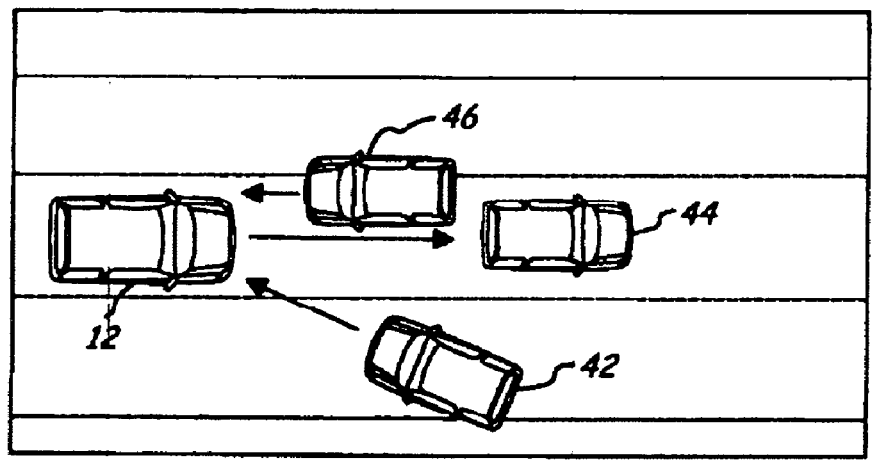
FIG. 4 is a top view illustration of multiple potential collision scenarios between a host vehicle and multiple target vehicles.

FIG. 4 illustrates multiple potential collision scenarios between target vehicles 42, 44, and 46 and the host vehicle 12. The approach of the target vehicle 42 towards the host vehicle 12 is an illustration of a potential oblique collision therebetween. The approach of the host vehicle 12 towards target vehicle 44 is an illustration of a potential full-frontal collision therebetween. The approach of target vehicle 46 towards the host vehicle 12 is an illustration of a potential left-side offset collision therebetween.

Referring again to FIG. 3, in step 112, the occupant sensors 32 generate the occupant characteristic or status signals 62. The occupant status signals 62 may include occupant information related to occupant classification, weight, size, and location within a seat system, as well as seat belt position or tension information, or other occupant related information known in the art.

In step 116, the coordinated device activation system 24 generates the countermeasure signal 64 to perform one or more countermeasures. The countermeasure signal 64 may be received by the restraints control module 66 or may be directly received by the countermeasure systems 34. The coordinated device activation system 24 may initiate, activate, or deploy the countermeasures. Thus, the coordinated device activation system 24 may directly or indirectly perform countermeasures in response to the collision severity signal 26, the collision contact location estimation values, the collision type signal 28, the collision type, and the occupant status signals 62.

In step 118, the controller 16 determines whether direct activation of a safety device is desired. The controller 16 determines whether to directly activate a safety device or whether to allow activation by the restraints control module 66. When direct activation is desired step 120 is performed, otherwise step 122 is performed. In step 120, the controller 16 directly deploys the particular safety device within actuation limits and as appropriate for the given collision type and severity. In step 122, the controller 16 signals the restraints control module 66 via a supervisory type signal or the countermeasure signal 64 to deploy the safety device. The countermeasure signal 64 may include collision type and collision severity related information, and desired safety systems to deploy. In step 124, the restraints control module 66 deploys the safety device.

The above-described steps are meant to be illustrative examples; the steps may be performed sequentially, synchronously, simultaneously, or in a different order depending upon the application.

The present invention provides a vehicle safety system that provides accurate collision type determination including collision severity and collision contact location related information. The present invention provides improved collision assessment for improved safety system and countermeasure performance.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A safety system for a vehicle, said safety system comprising:
    a plurality of collision detection sensors coupled to the periphery of said vehicle and operable to generate at least one collision detection signal; and
    a controller coupled to said plurality of collision detection sensors and comprising (i) a collision contact location estimator for determining a collision type, which includes determining a collision severity and a collision contact location on said vehicle, in response to said at least one collision detection signal, and (ii) a coordinated device activation system for performing at least one countermeasure in response to said collision type;
    wherein said collision contact location estimator, in determining said collision severity, is operable to generate at least one collision severity signal corresponding to approximately $K_i V_i(1-e^{-\tau t})$, in which $V_i$ is voltage output from the $i^{th}$ collision detection sensor, $K_i$ is an adaptive gain, and $\tau$ is an adjustable filter time-constant.

2. A safety system as in claim 1, said safety system further comprising:
    an occupant sensor located onboard said vehicle and operable to generate an occupant characteristic signal;
    wherein said controller is coupled to said occupant sensor and operable to determine an occupant status in response to said occupant characteristic signal and also perform at least one countermeasure in response to both said occupant status and said collision type.

3. A safety system as in claim 1, wherein said plurality of collision detection sensors includes discretized patch sensors that are at least partially formed of a poly-vinylidine fluoride material.

4. A safety system as in claim 1, wherein said plurality of collision detection sensors includes discretized patch sensors that are in a composite form.

5. A safety system as in claim 1, wherein said plurality of collision detection sensors are coupled to a bumper of said vehicle.

6. A safety system as in claim 1, wherein said plurality of collision detection sensors are in the form of a plurality of discretized patch sensors.

7. A safety system as in claim 6, wherein said collision contact location estimator is operable to determine said collision contact location relative to said plurality of discretized patch sensors in response to values selected from at least one of a plurality of location threshold values, time synchronized comparative magnitude values, and signature values of the collision detection signals.

8. A safety system as in claim 6, wherein said collision contact location estimator is operable to determine said collision contact location relative to said plurality of discretized patch sensors in response to at least one collision confirmation threshold value.

9. A safety system as in claim 1, said safety system further comprising:
   an occupant sensor located onboard said vehicle and operable to generate an occupant characteristic signal;
   wherein said controller is coupled to said occupant sensor, and said coordinated device activation system is operable to perform at least one countermeasure in response to both said occupant characteristic signal and said collision type.

10. A safety system as in claim 1, wherein said plurality of collision detection sensors are at least partially formed of a poly-vinylidine fluoride material.

11. A safety system as in claim 1, wherein said plurality of collision detection sensors are in a composite form.

12. A safety system as in claim 1, wherein said plurality of collision detection sensors are non-accelerometer type sensors.

13. A safety system as in claim 1, wherein said collision contact location estimator is operable to determine said collision contact location relative to said plurality of collision detection sensors in response to values selected from at least one of a plurality of location threshold values, time synchronized comparative magnitude values, and signature values of the collision detection signals.

14. A safety system as in claim 1, wherein said collision contact location estimator is operable to determine said collision contact location relative to said plurality of collision detection sensors in response to at least one collision confirmation threshold value.

15. A safety system as in claim 14, wherein said coordinated device activation system is operable to perform said at least one countermeasure based on the contacted area of said vehicle when said collision confirmation threshold value is exceeded.

* * * * *